United States Patent [19]

Eastman et al.

[11] Patent Number: 5,223,186
[45] Date of Patent: Jun. 29, 1993

[54] MICROWAVE SINTERING OF NANOPHASE CERAMICS WITHOUT CONCOMITANT GRAIN GROWTH

[75] Inventors: Jeffrey A. Eastman, Woodbridge, Ill.; Kurt E. Sickafus, Santa Cruz; Joel D. Katz, Los Alamos, both of N. Mex.

[73] Assignee: The United States of America as represented by the United States Department of Energy, Washington, D.C.

[21] Appl. No.: 685,117

[22] Filed: Apr. 15, 1991

[51] Int. Cl.$^5$ ............................................. C04B 35/64
[52] U.S. Cl. ......................................... 264/25; 264/56; 264/60; 264/26
[58] Field of Search ..................... 264/25, 56, 60, 26

[56] References Cited

U.S. PATENT DOCUMENTS 4,163,140 7/1979 Bardet ................................. 264/25

OTHER PUBLICATIONS

Sutton, Microwave Processing of Ceramic Materials, Ceramic Bulletin, vol. 68, No. 2, 1989.
Hahn et al., "Sintering Characteristics of Nanocrystalline TiO$_2$", J. Mater. Res., vol. 5, No. 3, Mar. 1990.
Blake and Meek, "Microwave Processed Composite Materials".
Wilson and Kunz, "Microwave Sintering of Partially Stabilized Zirconia".
Kemer and Johnson, "Microwave Plasma Sintering of Alumina".
Eastman et al., "Microwave Sintering of Nanocrystalline TiO$_2$".

Primary Examiner—James Derrington
Attorney, Agent, or Firm—Thomas G. Anderson; Robert J. Fisher; William R. Moser

[57] ABSTRACT

A method of sintering nanocrystalline material is disclosed wherein the nanocrystalline material is microwaved to heat the material to a temperature less than about 70% of the melting point of the nanocrystalline material expressed in degrees K. This method produces sintered nanocrystalline material having a density greater than about 95% of theoretical and an average grain size not more than about 3 times the average grain size of the nanocrystalline material before sintering. Rutile TiO$_2$ as well as various other ceramics have been prepared. Grain growth of as little as 1.67 times has resulted with densities of about 90% of theoretical.

22 Claims, 3 Drawing Sheets

MICROWAVE SINTERING OF NANOPHASE CERAMICS WITHOUT CONCOMITANT GRAIN GROWTH

The U.S. Government has rights in this invention pursuant to Contract No. W-31-109-ENG-38 between the U.S. Department of Energy and The University of Chicago representing Argonne National Laboratory.

BACKGROUND OF THE INVENTION

This invention relates to methods of sintering nanophase materials and more particularly to sintering nanocrystalline ceramics in order to increase densities while retaining small grain size. Ceramics find many uses in industry particularly for electrical components. However, internal flaws and high temperature processing along with negligible ductility of ceramics are problems which mitigate against their uses. Improved physical characteristics have been achieved by reducing the particle size of the starting powders from which the ultimate ceramics are made. Small particle sizes have the advantages that densification depends inversely on the fourth power of particle size, internal flaws associated with larger pores are minimized, and ductility can be gained through other mechanisms known in the art. Ultra fine grain metals have been prepared by Glaiter about 10 years ago, *Deformation of Polycrystals*: Mechanisms and Microstructures, N. Hansen et al. eds (Ris National Laboratory, Roslalde, Norway 1981), in which inert gas condensation of metal vapors is combined with in situ collection and compaction of the ceramic powders to produce nanocrystalline ceramics. These ceramics have potentially important properties such as low sintering temperatures and superplasticity. By nanocrystalline materials, it is meant in this application, materials having average grain sizes of 100 nanometers or less and preferably grain sizes of 60 nanometers or less. Green body density of ceramic nanocrystalline materials can approach 75% of theoretical, but for most purposes densities of the fired ceramic should be greater than about 90% of theoretical.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

OBJECTS OF THE INVENTION

Figure 1:
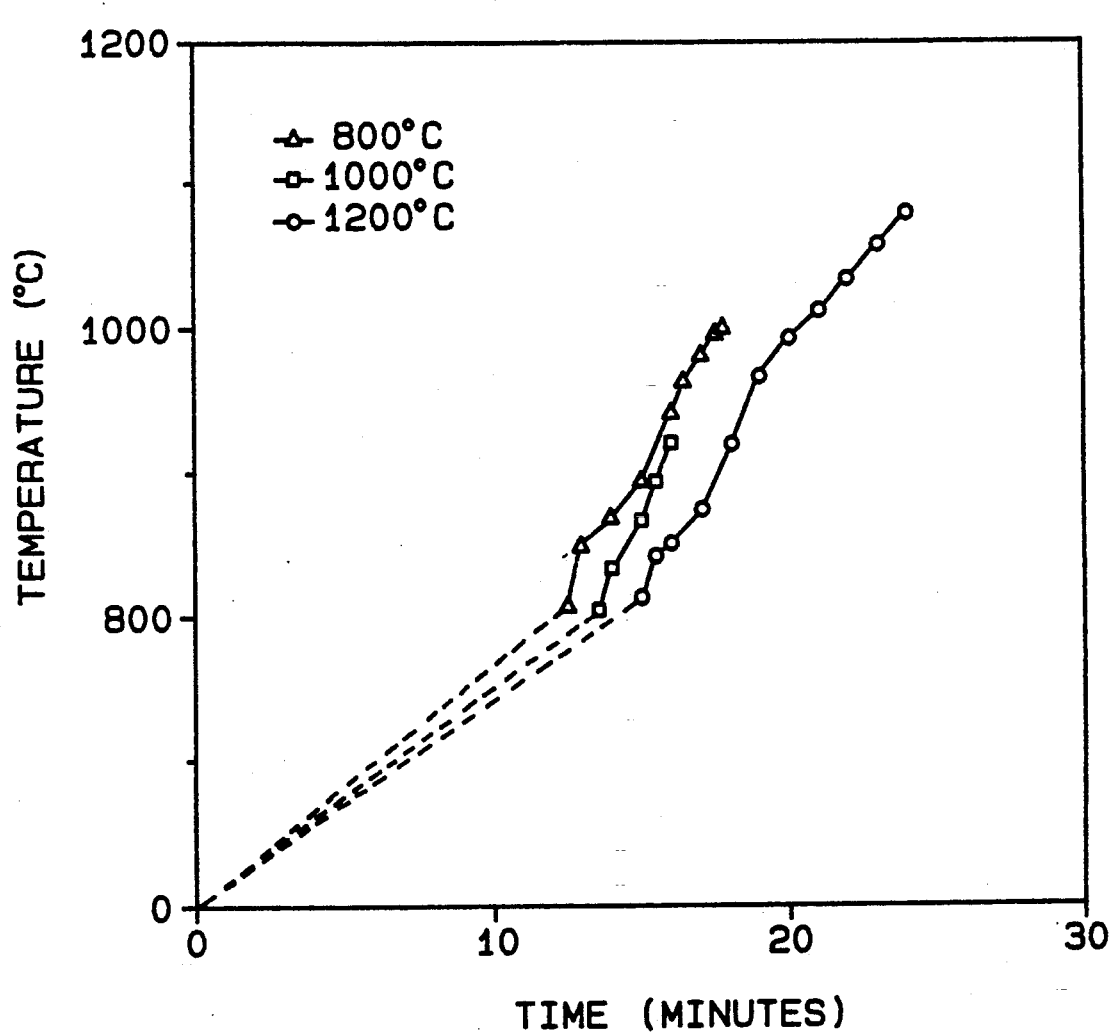
FIG. 1 is a graph showing the time-temperature curves for each of the microwave samples.

An object of this invention is to provide a method of sintering and densifying nanocrystalline ceramics to provide densities in excess of 90% of theoretical while maintaining grain sizes at 60 nanometers or less.

Another object of the invention is to provide a method of sintering nanocrystalline material comprising subjecting nanocrystalline material to microwave energy to heat the material to a temperature less than about 70% of the melting point of the nanocrystalline material expressed in degrees K, to produce sintered nanocrystalline material having a density greater than about 95% of theoretical and an average grain size not more than about 3 times the average grain size of the nanocrystalline material before sintering.

Another object of the invention is to provide a method of sintering nanocrystalline material comprising subjecting the material to microwave energy sufficient to heat the nanocrystalline material to a temperature at which the nanocrystalline material both sinters and densifies for a period of time required to obtain a density greater than about 90% of theoretical with average grain size not greater than about 60 nanometers and thereafter cooling said material.

A final object of the invention is to provide a method of sintering nanocrystalline rutile $TiO_2$ comprising subjecting the rutile $TiO_2$ to 2.45 $GH_z$ microwave energy for a period of time sufficient to raise the temperature thereof not in excess of about 70% of the melting point of rutile $TiO_2$ expressed in degrees K, thereafter cooling said $TiO_2$ whereby in excess of 90% of theoretical density is achieved with grain sizes less than about 40 nanometers.

PREFERRED EMBODIMENT OF THE INVENTION

Nanocrystalline materials may be made from a variety of metals and non-metals. Nanocrystalline ceramics have significant uses for both structural and electrical components. Ceramics which are of most interest are the oxides and the nitrides. The term "ceramics" as used herein includes composites of several discrete ceramic phases intermixed as well as ceramic alloys in which a new phase is produced. Some of the ceramics of interest may be formed from one or more of Ti, Mg, Zn, Al, Pb, Cu, Dy, Eu, Pd, Fe, Si, W and alloys thereof either as oxides or as nitrides where applicable. For instance, a ceramic alloy of nanocrystalline W-Mg oxide has been made.

Further, it has been found including dopant quantities of materials (generally less than about 1 atom percent) in ceramics may enhance the densification characteristics such as doping rutile titanium dioxide with yttrium.

One of the inherent problems in densifying bulk nanocrystalline material while limiting the grain growth during the densification process is that both densification and grain growth result from atomic motion, and it has been difficult to prepare nanocrystalline material having high theoretical densities and very small grain sizes. As used herein, grain sizes refer to average grain sizes because it is understood by those skilled in this art that individual grains larger than nano size may occur while the average grain size of material will be well within the nanocrystalline range. Nanocrystalline range as used herein means average grain size of about 100 nanometers or less and preferably 60 nanometers or less, it being understood that in general the smaller the average grain size, the better the resulting physical characteristics.

The rutile phase of nanocrystalline $TiO_2$ has been prepared and used extensively in experiments defining the characteristics of nanocrystalline materials. In addition, nanocrystalline magnesium oxide has been prepared and these two oxides illustrate the fact that each ceramic has its own typical grain size which occurs during the preparation of nanocrystalline material. For instance, rutile phase nanocrystalline $TiO_2$ when prepared as hereinafter set forth typically has an average grain size of about 12 nanometers whereas nanocrystalline magnesium oxide when prepared according to the method hereinafter set forth typically has an average grain size of about 5 nanometers. Resultant grain growth during densification starts from the grain size of the green nanocrystalline material.

It has been found that subjecting the green nanocrystalline ceramics to microwave energy for a time sufficient to elevate the temperature of the specimen to between about 60% to about 70% of the melting point of the material, expressed in degrees Kelvin, results in densifications between about 90% and 95% of theoretical and with a resultant increase in grain size from about 1.67 times for the lower temperature sintering to about 3 times for the higher temperature sintering. By this discovery, the inventors herein have determined an important relationship between the growth of grain size and the densification to permit relatively dense nanocrystalline materials to be prepared from bulk or green nanocrystalline material while limiting the grain growth to obtain a true nanocrystalline material with suitable density and grain size.

Nanocrystalline $TiO_2$ compacts were produced at Argonne. Ti wire (99.99% purity) is evaporated in 500 Pa of He gas (99.9999% purity) in a vacuum chamber that has been evacuated to a typical pressure of $10^{-5}$ Pa prior to the introduction of the He. Ultrafine gas-borne Ti powders are formed due to collisions between the Ti vapor and the He and are collected on a liquid-nitrogen-filled cold finger. After completing the evaporation process, the vacuum chamber is again pumped to $10^{-5}$ Pa and the cold finger is warmed to room temperature. The Ti powder is then spontaneously oxidized to $TiO_2$ by the rapid introduction to the chamber of approximately 5 kPa of $O_2$ gas (99.98% purity). After again evacuating the chamber, the powder is removed from the cold finger using a Teflon (registered trademark of DuPont) annular ring and is transported by gravity to a two-step in-situ compaction device. Finally, the powders are consolidated in vacuum at ambient temperature under high pressure (typically 1.4 GPa). The samples produced are in the form of disks having a diameter of 9 mm and typical thicknesses of 0.1 to 0.5 mm.

The samples were sintered in the Los Alamos microwave processing facility. This 2.45 GHz microwave facility consists of a 6 kW microwave power supply, a 0.028 $m^3$ resonant cavity equipped with a rotating specimen table and a two-color infrared pyrometer. Each sample was positioned between three low density $ZrO_2$ insulating blocks that were stacked and placed on the specimen platform in the cavity. The blocks were 6.35 cm diameter square, 3.8 cm thick. The center block contained a hole with a groove on the bottom in which the samples were mounted on edge. Temperature was monitored pyrometrically using a sapphire light pipe positioned approximately 3 mm from the sample. The green compacts were processed under flowing argon.

Each sample was heated rapidly from ambient to a maximum temperature of 800°, 1000° or 1200° C. and then the power was immediately cut off and the samples were allowed to cool. The time versus temperature curves are shown in FIG. 1.

Green densities were estimated by weighing each sample and measuring the disk dimensions with a micrometer. The results are indicated in Table 1. This technique insured minimal contamination of the nanocrystalline $TiO_2$ samples prior to sintering, but typically gave lower density measurements than were obtained by Archimede's method. Archimede's method employed by weighing samples in air and in either deionized water or 1,1,1 trichloroethane, was used to determine accurate densities and open pore content of the samples following sintering, as well as to determine the density of one unsintered control sample.

Powder x-ray diffraction techniques using Mo-K$\alpha$ radiation ($\lambda$=0.071 nm) were used to determine the crystalline phases present in the samples and to estimate the average grain sizes. The samples were mounted on a Lucite holder. X-ray collimation at the sample was about 1 cm $\times$ 1 cm. Data analysis was performed using a background correction program and a peak fitting algorithm. The full-width at half-maximum intensity (FWHM) of the fit was used with the Scherrer equation to obtain the grain size estimates. Samples were also examined using transmission electron microscopy before and after sintering. Grain size histograms were obtained from diffraction-contrast darkfield images taken with JEOL 100CX operated at 100 kV. Samples were obtained by breaking small fragments from the disk edge with a sharp pair of tweezers and then dragging a C-coated Cu grid through this residue or by rubbing the grid over the surface of the sample. Each sample was also examined before and after sintering using He$^+$ and He$^{++}$ Rutherford backscattering spectrometry (RBS) at both 2.2 and 8.8 Mev.

TABLE 1

Grain size/density data for microwave-sintered nanocrystalline $TiO_2$.

| Maximum Sintering Temperature | Density Initial (Direct) | (% Theoretical) Final (Archimedes) | Grain Size After Sintering (nm) Dark-field TEM | X-ray |
|---|---|---|---|---|
| Pristine* | 54.9 | 70.4 | 14 | 8 |
| 800 | 61.7 | 68.7 | 16 | 9 |
| 201000 | 53.8 | 87.8 | 28 | 19 |
| 1200 | 59.6 | 92.8 | 18 | 35 |

*Rutile theoretical density = 4.26 g/cm$^3$.

Figure 2:
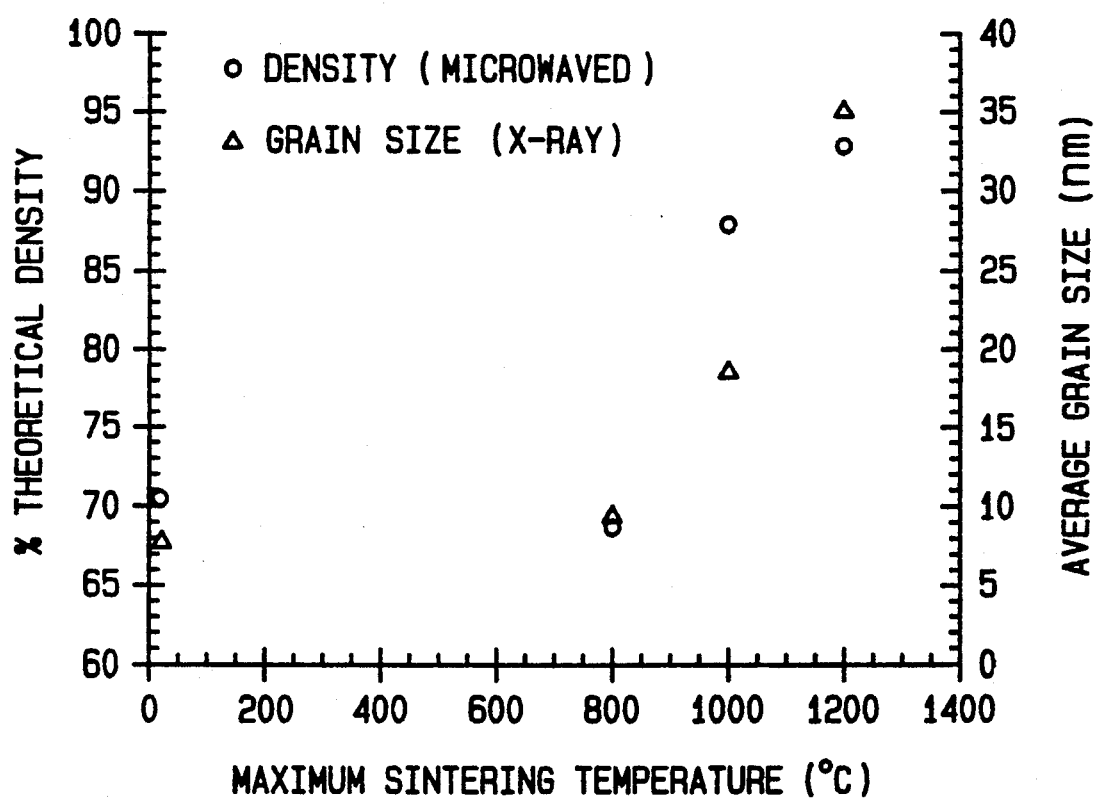
FIG. 2 is a graph showing the relationship between grain size and density versus maximum sintering temperature for microwave sintered samples.
Figure 3:
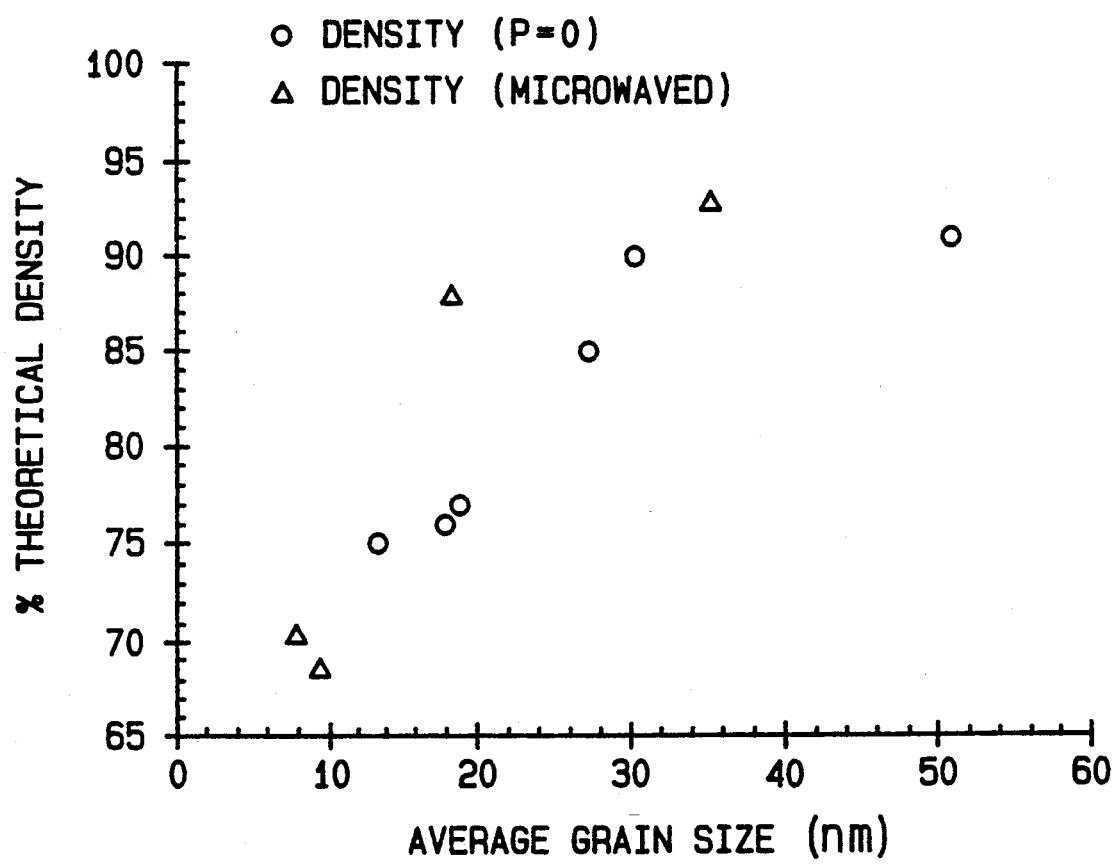
FIG. 3 is a graph showing the grain size versus density plot showing a comparison between the microwave sintering of the invention with prior art nanocrystalline sintering.

The changes in density and grain size of nanocrystalline $TiO_2$ compacts resulting from the microwave sintering treatments are summarized in FIG. 2 and Table 1. The samples were observed to have very high green densities ($\sim$70% of theoretical). Microwave-sintering at maximum temperature of $\leq$800° C. had little effect on either the density or grain size of the samples. It was observed that nanocrystalline $TiO_2$ could be sintered to almost 90% of theoretical density in very short times while maintaining a grain size of less than 20 nm when microwaved to a maximum temperature of 1000° C. This is a significant improvement over the behavior of nanocrystalline $TiO_2$ samples that were sintered conventionally at lower temperatures for much longer times. A comparison of the present results with data obtained by prior art sintering is shown in FIG. 3. Increasing the maximum microwave-sintering temperature to 1200° C. increased the density to above 93%, but at a cost of increasing the grain size to 35 nm. However, it should be noted that the heat-up rate for the 1200° C. sample was somewhat lower than that for the 1000° C. sample. The density results indicate that most of the porosity in the samples is open until the total density approaches 90% of theoretical. TEM observations revealed no evidence of abnormal grain growth.

It was found that TEM and x-ray techniques yielded somewhat different values for the measured average grain sizes, with the TEM values being larger than the x-ray values for the pristine, 800° and 1000° samples, but smaller for the 1200° sample. There are several possible reasons for this behavior. The x-rays penetrate more than 50 microns into the sample while the TEM samples used in this study were obtained only from the outer surfaces of the sample. Thus, it is possible that this indicates that the sintering behavior at the sample surfaces differs from that in the bulk. This is not surprising because the green compacts always have a rather low density outer rim and most of the material used for TEM samples comes from this area. For this reason we believe the x-ray results are more meaningful, particularly for the 1000° and 1200° C. samples. However, the x-ray results are also subject to potential artifacts, primarily due to either the background contributions from the sample holder or the contribution of strain in the samples to the broadening of the diffracted peaks. If the residual strain in the sample is significant, the Scherrer formula will underestimate the true average grain size. The presence of strain in a sample is indicated by a systematic change in apparent grain size as 2-theta increases. Such behavior was seen in the x-ray data obtained from the pristine and 800° C. samples. The 1000° and 1200° C. -sintered samples were initially even more highly strained than the other two samples (they were visibly bowed), but the strain was released by breaking the samples into fragments. These fragments showed no sign of residual strain and thus we believe the grain size values obtained from them were accurate.

X-ray diffraction revealed the samples to consist of primarily the rutile phase of $TiO_2$, but small amounts (order of 5%) of anatase $TiO_2$ were also seen in the pristine and 800° C.-sintered samples. No sign of anatase was seen in either sample heated to higher temperatures. Samples underwent both shape and color changes as a result of the sintering process. The samples were originally black, but took on an increasingly yellowish appearance following sintering with the higher temperature-sintered samples showing more yellow than the 800° C. sample, which had only a yellowish-appearing rim. The samples also showed appreciable warpage and cracking at higher temperatures. RBS data showed no change in oxygen content as a result of sintering in argon. Thus the color changes in the samples are presumably correlated with changes in grain size.

Analyzing the data set forth herein, it will be seen that a relationship exists between the sintering temperature expressed as a percent of the melting point in degrees K and the increase in the grain size from the bulk sintered material.

For instance, the melting point of rutile $TiO_2$ is 2143° K. and 1000° C. (1273° K.) is about 59% of the melting point. Rutile $TiO_2$ produced in bulk has an average grain size of about 12 nanometers while the 90% theoretical density material produced by microwaving the material to a temperature of 1000° C. or 1273° K. produces an average grain size of about 20 nanometers. The increase in grain size is about 67%. Exposing the rutile $TiO_2$ to microwave energy until temperatures of about 59% of the melting point of the material (expressed in degrees Kelvin) are reached results in grain growth of about 67% and increase in density to about 90% of theoretical. Nanocrystalline magnesium oxide in bulk (green) form has an average grain size of about 5 nanometers and the melting point of magnesium oxide is 3,073° K. (2800° C.). Microwaving nanocrystalline magnesium oxide to about 59% of its melting point or about 1540° C. will produce grain sizes of about $8\frac{1}{3}$ nanometers. On the other hand, by exposing rutile $TiO_2$ to temperatures of 1200° C. or about 70% of the melting point (2143° K.) of the rutile $TiO_2$, the density is increased from about 90% to about 95% but the grain growth instead of being increased 67% is now a 200% increase so that 12 nanometer bulk (or green) material now has an average grain size of about 35 nanometers. For magnesium oxide, an exposure to microwave energy to about 70% of its melting point or about 1878° C. (2151° K.) results in a 95% dense material having an average grain size of about 15 nanometers.

Since the grain size grows exponentially as the sintering temperature increases, it will be seen that very rapid grain growth occurs at temperatures above about 70% of the melting point of the nanocrystalline material (expressed in degrees Kelvin).

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are define as follows:

1. A method of sintering nanocrystalline ceramic material comprising subjecting nanocrystalline ceramic material to microwave energy at atmospheric pressure to heat said ceramic material to a temperature less than about 70% of the melting point of the nanocrystalline ceramic material expressed in degrees K., to produce sintered nanocrystalline ceramic material having a density greater than about 95% of theoretical and an average grain size not more than about 60 nanometers after sintering.

2. The method of claim 1, wherein the nanocrystalline ceramic material is heated in the range of from about 60% to about 70% of the melting point of the ceramic material expressed in degrees K. to produce nanocrystalline ceramic material having a density greater than 90% of theoretical and an average grain size in the range of from about 1.67 to about 3 times the average grain size before sintering.

3. The method of claim 2, wherein the nanocrystalline ceramic material is a ceramic of rutile $TiO_2$ having an initial grain size of about 12 nm.

4. A method of sintering nanocrystalline ceramic material comprising subjecting said ceramic material to microwave energy at atmospheric pressure sufficient to heat the nanocrystalline ceramic material to a temperature at which the nanocrystalline ceramic material both sinters and densifies for a period of time required to obtain a density greater than about 90% of theoretical with average grain size not greater than about 60 nanometers and thereafter cooling said ceramic material.

5. The method of claim 4, wherein said cooling begins immediately after the nanocrystalline ceramic material reaches the sintering and densifying temperature.

6. The method of claim 4, wherein the nanocrystalline ceramic material is heated at a uniform rate to the desired temperature.

7. The method of claim 5, wherein said nanocrystalline ceramic material is rutile $TiO_2$, said temperature is about 1000° C. and said average grain size is less than about 20 nanometers.

8. The method of claim 5, wherein said nanocrystalline ceramic material is rutile $TiO_2$, said temperature is about 1200° C. and said average grain size is about 35 nanometers.

9. The method of claim 4, wherein said ceramic material is a ceramic composite.

10. The method of claim 4, wherein said ceramic material is a ceramic alloy.

11. The method of claim 4, wherein the ceramic contains oxides.

12. The method of claim 4, wherein the ceramic contains nitrides.

13. The method of claim 4, wherein the ceramic is formed from one or more of Ti, Mg, Zn, Al, Pd, Cu, Dy, Eu, Gd, Er, Fe, Si, W and alloys thereof and one or more non-metals.

14. The method of claim 9, wherein the ceramic composite has one ingredient present in dopant quantities.

15. The method of claim 9, wherein the nanocrystalline ceramic material is present as a major constituent of the composite.

16. The method of claim 9, wherein the nanocrystalline ceramic material is present as a minor constituent of the composite.

17. The method of claim 9, wherein the entire composite is nanocrystalline ceramic material.

18. The method of claim 4, wherein the maximum temperature to which the nanocrystalline ceramic material is heated is not greater than about 70% of the melting point of the ceramic material expressed in degrees K.

19. The method of claim 4, wherein the maximum temperature to which the nanocrystalline ceramic material is heated is not greater than about 60% of the melting point of the ceramic material expressed in degrees K.

20. A method of sintering nanocrystalline rutile $TiO_2$ comprising subjecting said rutile $TiO_2$ to 2.45GH, microwave energy at atmospheric pressure for a period of time sufficient to raise the temperature thereof not in excess of about 70% of the melting point of rutile $TiO_2$ expressed in degrees K., thereafter cooling said $TiO_2$ whereby in excess of 90% of theoretical density is achieved with grain sizes less than about 40 nanometers.

21. The method of claim 20, wherein the rutile $TiO_2$ is subjected to microwave energy until a temperature of 1000° C. is reached and immediately cooled to provide a density of greater than 90% theoretical with average grain sizes less than about 20 nanometers.

22. The method of claim 1 wherein the average grain size of the nanocrystalline ceramic material after sintering is not more than about 3 times the average grain size of the nanocrystalline ceramic material before sintering.

* * * * *